United States Patent

[11] 3,614,166

| [72] | Inventor | Wolfgang Spitz<br>Dassendorf, Germany |
|---|---|---|
| [21] | Appl. No. | 785,463 |
| [22] | Filed | Dec. 20, 1968 |
| [45] | Patented | Oct. 19, 1971 |
| [73] | Assignee | Tobacco Research and Development<br>Institute Limited<br>Zug, Switzerland |
| [32] | Priority | Jan. 2, 1968 |
| [33] | | Great Britain |
| [31] | | 305/68 |

[54] ARTICLE-FEEDING SYSTEM
2 Claims, 1 Drawing Fig.

[52] U.S. Cl. .................................................. 302/2
[51] Int. Cl. ............................................. B65g 53/00
[50] Field of Search .......................................... 302/2;
221/10;.222/56

[56] References Cited
UNITED STATES PATENTS

| 3,336,085 | 8/1967 | Strydom | 302/2 |
| 3,089,732 | 5/1963 | Gamberini | 302/2 |
| 3,222,110 | 12/1965 | Kelly et al. | 302/2 |
| 3,411,827 | 11/1968 | Rupert | 302/2 |

Primary Examiner—Andres H. Nielsen
Attorney—Young & Thompson

ABSTRACT: The invention is concerned with a pneumatic conveyance system in which rod-shaped articles such as filter rods are dispatched into a pipeline at a point of supply, pneumatically conveyed to a point of consumption, extracted from the pipeline and fed to a storage bin from which consumption takes place. In the system of the invention rods can be fed into the pipeline at two rates, one of which is higher than the expected rate of consumption and the other of which is lower. If the bin level goes too high, the second rate is applied and if the bin level drops, the first rate is applied. Thus conveyance is never completely interrupted.

PATENTED OCT 19 1971
3,614,166
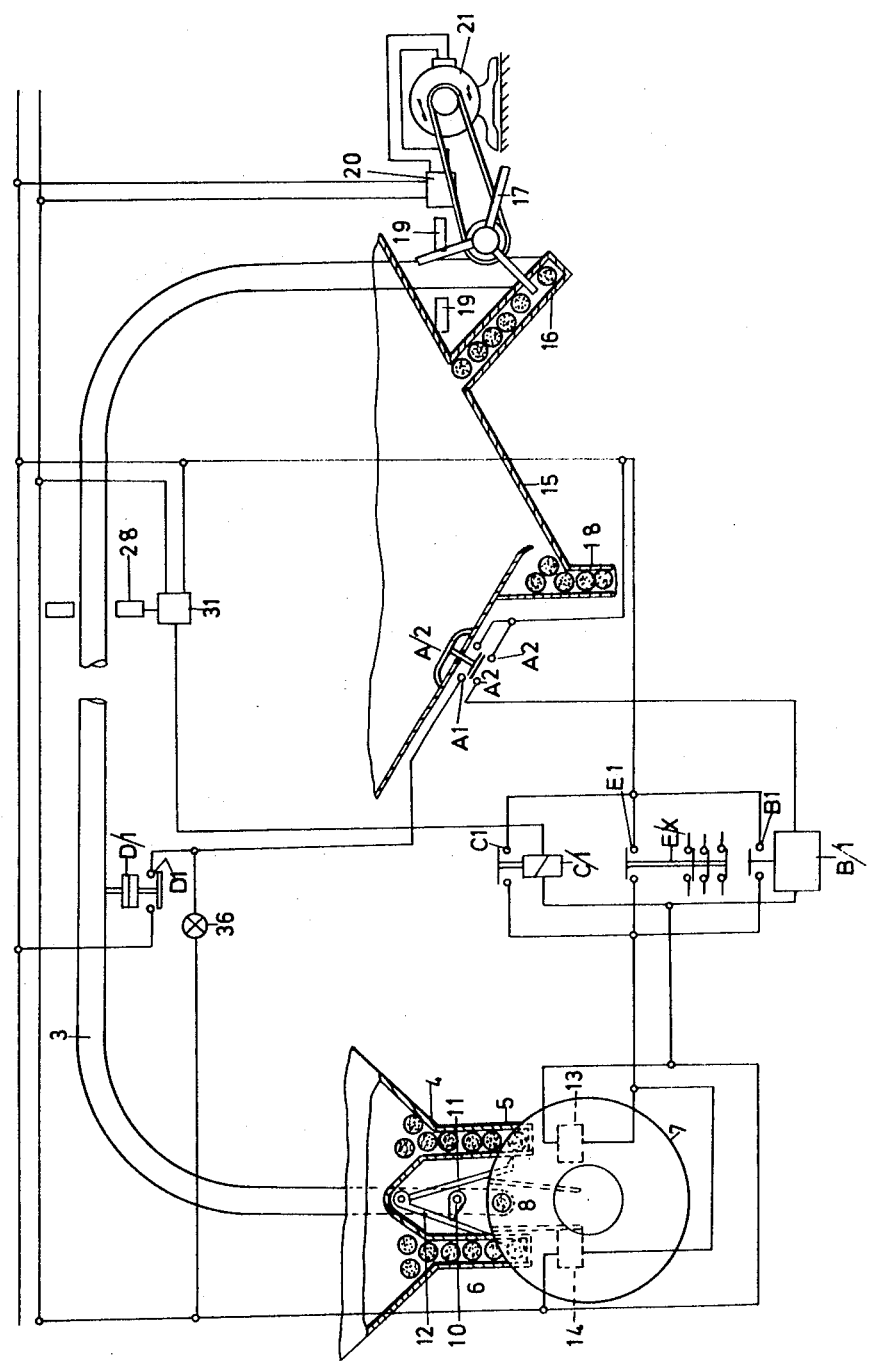
INVENTOR
WOLFGANG SPITZ
BY Young & Thompson
ATTYS.

ARTICLE-FEEDING SYSTEM

This invention relates to an article-feeding system in which rod-shaped articles such as filter rods and cigarettes are pneumatically conveyed between a supply point and a point of consumption.

Various systems of the kind in question have already been proposed. What they have in common is means at the supply point for feeding articles into a pneumatic pipeline, the pipeline and means to extract articles from the pipeline and insert them into a storage hopper at the point of consumption. Means for feeding articles into a pipeline has, for example, been described in U.S. Pat. No. 3,411,827. Means for extracting articles from a pipeline and feeding them into a storage hopper have, for example, been described in U.S. Pat. No. 3,336,085.

A problem with these systems is that supply and demand seldom match one another. Even if they do, it has been found that rod-shaped articles dispatched into a pneumatic conveyance line at regular intervals do not necessarily arrive in a timed sequence as they seem to tend to congregate in batches. One cannot simply feed articles into the line at the same rate as they are consumed from the storage hopper at the other end.

For these reasons it has been proposed to feed the articles into the line at a faster rate than the maximum expected rate of consumption, to monitor the level in the storage hopper and to cease dispatch of articles when a predetermined high level is reached. When the level drops to a predetermined level, dispatch is resumed.

The procedure outlined involves the stopping or at least the blocking of the means for feeding articles into the line and, unless one wants to waste power, the closing down of the pneumatic conveying line. Starting and stopping leads to unevenness of operation and is most undesirable in a pneumatic air line.

An object of the invention is to provide a method and means which will allow more or less continuous operation of a pneumatic conveyance line.

The present invention provides a method of conveying rod-shaped articles from a point of supply to storage at a point of consumption by pneumatic means along a pipeline in which articles are dispatched into a line in succession, extracted from the line at the consumption point and added to a store from which consumption takes place and the amount of articles in storage is monitored to control the dispatch characterized in that articles are arranged to be dispatched at two rates, the first rate being higher than the maximum expected rate of consumption and the second rate being lower than the minimum expected rate of consumption, the first rate being applied when the amount stored is below a first predetermined level and the second rate being applied when the amount stored is above a second predetermined level.

Apparatus according to the invention comprises a pneumatic conveyance pipeline, means at the point at supply for dispatching articles into the pipeline, a storage hopper at the point of consumption, means to extract articles from the pipeline and feed them into the storage hopper from which consumption takes place, storage hopper, characterized in that the dispatching means is arranged to operate at two speeds, the first of which is higher than the maximum expected rate of consumption and the second of which is lower than the minimum rate of consumption, in that the monitoring means senses when articles in the hopper are at a predetermined low level and when articles are above a predetermined high level, and in that control means responsive to the monitoring means is provided, the control means causing the dispatching means to operate at the first speed when articles are below the predetermined low level and to operate the the second speed when the articles are above the predetermined high level.

The invention is further discussed with reference to the accompanying drawing which is a schematic drawing of a pneumatic conveying installation with the circuit diagram of the control systems superimposed.

The main element of the system is the pipeline 3 which operates in any suitable way by suction and/or pressure supplied by well-known means not shown. At the inlet end of the pipeline 3 there is a dispatch device of the kind disclosed in U.S. Pat. No. 3,411,827. The relevant parts of the dispatch device have been illustrated more or less diagrammatically and consist in a hopper 4, slots 5 and 6 down which rods gravitate, an axially bored, oscillating drum 7 arranged to oscillate, and a terminal 8 for the pipeline. In use bores in the drum 7 oscillate between a position of dwell where a bore is in register with the foot of a slot 5 or 6 and a position of dwell where the bore is in register with the terminal 8. Rods are sucked into the bores when they register with the feet of the slots and in the other position of dwell are sucked or forced in the pipeline.

When an article at the foot of a slot 5 or 6 is being sucked away, gravitation of articles into the void space is prevented by stops 11 or 12 which are acted upon by a cam 10. Each stop may be held in its obstructing position by means of a solenoid 13 or 14 and when so held no articles reach the foot of its slot 5 or 6.

This then is the known arrangement at the inlet end of the pipeline.

At the outlet end there is an arrangement which is known from U.S. Pat. No. 3,336,085.

This known arrangement consists in a hopper 15 one side of which is formed with a projecting slot 16. Articles delivered by the pipeline 3 are propelled along the slot 16 by means of a vaned rotor or paddle wheel 17. Articles are consumed from the hopper 15 through a slot 18. Towards the outlet end of the pipeline 3 there is a transparent section which is straddled by a photocell and light source 19 arranged to detect the presence of articles in the line. When articles are present a signal from the device 19 actuates a switch 20 for a motor 21 that drives the rotor 17. In the absence of articles the motor is switched off.

It should be noted that in the system thus far described, the drum 7 operates at a speed which is higher than the maximum rate of consumption from the hopper 15 and in the past, various methods were employed by means of which dispatch was interrupted if the level of articles in the hopper 15 reached too high a level.

In the improvements provided by the invention the speed of the drum 7 is kept as before. However, when the hopper 15 gets too full, the rate at which articles are allowed to be dispatched by the drum is halved. This may be done by energizing one of the solenoids 13 or 14 permanently so that its corresponding stop 11 or 12 is permanently latched. In this case articles remain static in one of the slots 5 or 6.

In an alternative method which is illustrated in the drawings both stops 11 and 12 are latched and unlatched together on a timed basis so that the drum dispatches articles at half the normal rate.

To determine the level of articles in the hopper 15 a pressure switch A/2 is provided. The latter is biased to close the contacts A1. The pressure of the rods in the hopper opens the contacts A1. While the contacts A1 are closed the warning lamp 36 is on. This is an indication that the level of rods is dangerously close to the mouth of the slot 16 and that the operator has to take care that the rods retain their orientation in the hopper 15.

As rods build up in the hopper 15 the pressure switch A/2 closes the contacts A2. As a result an interrupter B/1 is energized. The interrupter B1 opens and closes the contacts B1 on a cyclic basis. When the contacts B1 are bridged, the solenoids 13 and 14 are energized and thus the stops 11 and 12 are latched. When these contacts are open the stops 11 and 12 are unlatched. The cycling time of the interrupter B/1 is conveniently so arranged that the stops 11 and 12 are latched half the time, so that while the contacts A2 are closed rods are fed into the pipeline 3 at half the normal rate. Even though there is a conveying gap in the pipeline 3 the interrupter B/1 is so arranged that the gap is so short that there are always rods present in the pipeline 3.

There is a further photocell device 28 towards the outlet end of the pipeline 3 straddling a transparent section. The device 28 actuates a switching device 31 which energizes a solenoid C/1. The time delay in the devices 28 and 31 is such that passing rods do not cause the switch 31 to energize the relay C/1. However, when rods remain in the section monitored by the device 28, e.g. due to a blockage or a breakdown of the rotor 17, the solenoid C/1 is energized. This closes the contacts C1 and the solenoids 13 and 14 are energized to latch the stops 11 and 12. Note that this overrides the action of the interrupter B/1.

Somewhere along the pipeline 3 there is a pressure-sensitive switch D/1 which controls contacts D1 which are normally open when air flows through the pipeline 3 but which close when the pressure conditions in the line change from a chosen value. In the illustrated embodiment this also causes the lamp 36 to light up, but the switch D/1 can be arranged to control a separate lamp.

The illustrated device is particularly suitable for conveying filter rods from a making machine to a filter rod attachment device on a cigarette making machine. In this case the hopper 4 is fed from the making machine, while the attachment device draws its supplies from the slot 18. Usually a filter rod making machine makes rods at a rate fast enough to supply several attachment devices simultaneously. Thus there could be several bins 4 or a large bin 4 with several pairs of slots 5 and 6 with each pair serving another pipeline 3 leading to an attachment device.

The attachment device will usually consume electric power it its elements. In the drawing a switch E/x has been illustrated. This is the main switch for the attachment device circuits and when it is closed it opens contacts E1. When the latter are closed, the solenoids 13 and 14 are energized, the stops 11 and 12 latched and hence the drum 13 can send no rods even if it happens to be running. Only if the attachment device is operating, can dispatch of rods commence.

It is only necessary to consider the operation of one pipeline 3 as illustrated in the drawing. Once a supply of rods is present in the bin 4, the drum 13 is started and the pneumatic pipeline is put in action. Of course, the switch E/x must be on so that the contacts E1 are open. As soon as the device 19 detects the presence of rods, the motor 21 is started and the rotor 17 starts to operate. However, the lamp 36 will be on and the operator will know to take care about the orientation of the rods until the lamp goes off.

Once the lamp 36 is off the system operates unattended and rods are dispatched by the drum 7 at a rate faster than the filter attachment device can consume. Eventually the pressure switch A/2 closes the contacts A2 which causes the drum 7 to dispatch rods at half the previous rate. The attachment device now catches up with the rate of supply and hopper 15 empties until the contacts A2 open and the drum 7 resumes dispatch at full rate. If a fault arises on the attachment device, the switch E/x will be operated to close the contacts E2 and hence stop the dispatch altogether.

Except for the latter event the pipeline 3 always contains rods in the course of conveyance and it is therefore seldom necessary to shut off the operation of the pipeline 3.

I claim:

1. Apparatus for conveying rod-shaped articles from a point of supply to storage at a point of consumption comprising
   a pneumatic conveyance pipeline,
   dispatching means at the point of supply for continuously dispatching articles into the pipeline,
   two channels along which articles are fed to the dispatching means,
   a storage hopper at the point of consumption,
   means to extract articles from the pipeline and feed them into the storage hopper from which consumption takes place,
   means to monitor the level of articles in the storage hopper to produce a first signal when articles are above a predetermined high level in the hopper and produce a second signal when articles are below a predetermined low level in the hopper, and
   means to block the passage of articles along one channel, while the other channel remains open, the blocking means being rendered operative by the first signal to continuously block the channel on which it operates, being rendered inoperative by the second signal, and reducing the rate at which articles are continuously dispatched into the pipeline.

2. Apparatus for conveying rod-shaped articles from a point of supply to storage at a point of consumption comprising a pneumatic conveyance pipeline,
   dispatching means at the point of supply for continuously dispatching articles into the pipeline,
   two channels along which articles are fed to the dispatching means,
   a storage hopper at the point of consumption,
   means to extract articles from the pipeline and feed them into the storage hopper from which consumption takes place,
   means to monitor the level of articles in the storage hopper to produce a first signal when articles are above a predetermined high level in the hopper and produce a second signal when articles are below a predetermined low level in the hopper, and
   means for intermittently blocking both channels in response to the first signal, the blocking means being rendered inoperative by the second signal and, when operative, reducing the rate at which articles are continuously dispatched into the pipeline.